(12) United States Patent
Davidson et al.

(10) Patent No.: US 12,450,354 B2
(45) Date of Patent: Oct. 21, 2025

(54) LOCATION-BASED IHS DISABLEMENT SYSTEM AND METHOD

(71) Applicant: Dell Products, L.P., Round Rock, TX (US)

(72) Inventors: Jason Davidson, Albany, OR (US); Dominique Prunier, Montreal (CA); Andrew Nepogodin, Round Rock, TX (US); Bridget Cate, Taylors, SC (US); Elie Antoun Jreij, Pflugerville, TX (US); Yun Zhang, Shanghai (CN); Sisir Samanta, Round Rock, TX (US); Ching-Yun Chao, Austin, TX (US); Shibi Panikkar, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 191 days.

(21) Appl. No.: 18/341,028

(22) Filed: Jun. 26, 2023

(65) Prior Publication Data
US 2024/0427895 A1 Dec. 26, 2024

(51) Int. Cl.
*G06F 21/57* (2013.01)
(52) U.S. Cl.
CPC ........ *G06F 21/57* (2013.01); *G06F 2221/034* (2013.01); *G06F 2221/2111* (2013.01)

(58) Field of Classification Search
CPC .............. G06F 21/57; G06F 2221/034; G06F 2221/2111; G06F 21/88
See application file for complete search history.

(56) References Cited

U.S. PATENT DOCUMENTS

| | | | | |
|---|---|---|---|---|
| 9,600,670 | B2 * | 3/2017 | Goss | G06F 21/57 |
| 10,552,583 | B2 * | 2/2020 | Piccionelli | G06F 21/10 |
| 11,386,231 | B2 * | 7/2022 | Limaye | H04W 12/08 |
| 2006/0031830 | A1 * | 2/2006 | Chu | G06F 21/10 |
| | | | | 717/174 |
| 2010/0077066 | A1 * | 3/2010 | Chawla | G06F 9/4416 |
| | | | | 709/222 |
| 2022/0309287 | A1 * | 9/2022 | Xu | G06N 20/20 |
| 2022/0357464 | A1 * | 11/2022 | Peng | G01S 19/396 |
| 2024/0028732 | A1 * | 1/2024 | Ramaiah | G06F 21/575 |

* cited by examiner

*Primary Examiner* — Christopher A Revak
(74) *Attorney, Agent, or Firm* — Fogarty LLP

(57) ABSTRACT

Systems and methods for location-based IHS disablement in an Information Handling System (IHS) are described. In an embodiment, an IHS may include: a host processor; a security processor coupled to the host processor; and a memory coupled to the security processor, the memory having program instructions stored thereon that, upon execution, cause the security processor to: detect a location where the IHS is currently disposed; determine one or more restrictions associated with the detected location, each of the restrictions specifying a limitation to be imparted on a resource of the IHS; and communicate with the IHS to apply the determined restrictions.

20 Claims, 4 Drawing Sheets

LOCATION-BASED IHS DISABLEMENT SYSTEM AND METHOD

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for location-based IHS disablement in an Information Handling System (IHS) are described. In an embodiment, an IHS may include: a host processor; a security processor coupled to the host processor; and a memory coupled to the security processor, the memory having program instructions stored thereon that, upon execution, cause the security processor to: detect a location where the IHS is currently disposed; determine one or more restrictions associated with the detected location, each of the restrictions specifying a limitation to be imparted on a resource of the IHS; and communicate with the IHS to apply the determined restrictions.

According to another embodiment, a location-based IHS disablement method includes the steps of detecting a location where an Information Handling System (IHS) is currently disposed, determining whether the IHS is disposed at a restricted location or at an allowed location, and inhibiting or enabling operation of the IHS based on whether it is disposed at a restricted or allowed location respectively.

According to yet another embodiment, a memory storage device having program instructions stored thereon that, upon execution by an Information Handling System (IHS), cause the IHS to detect a location where the IHS is currently disposed, determine whether the IHS is disposed at a restricted location or at an allowed location, and inhibiting or enabling operation of the IHS based on whether it is disposed at a restricted or allowed location respectively.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
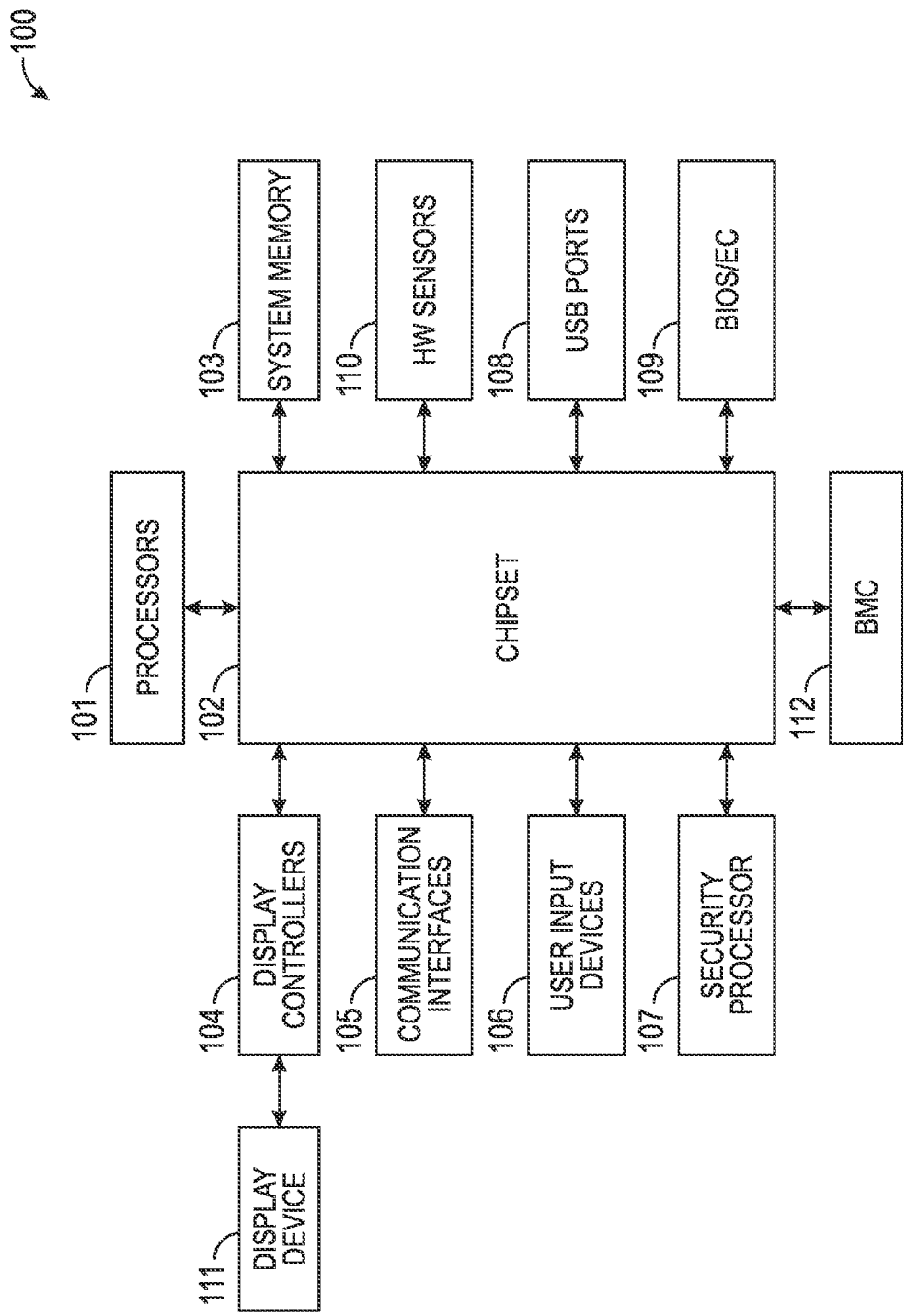
FIG. 1 is a block diagram of components of an example IHS that may implement a location-based IHS disablement system according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include random access memory (RAM), one or more processing resources such as a central processing unit (CPU) or hardware or software control logic, ROM, and/or other types of nonvolatile memory. Additional components of an IHS may include one or more disk drives, one or more network ports for communicating with external devices as well as various input and output (I/O) devices, such as a keyboard, a mouse, touchscreen and/or a video display. An IHS may also include one or more buses operable to transmit communications between the various hardware components. A more detailed example of an IHS is described with respect to FIG. 1. It should be appreciated that although certain embodiments are discussed in the context of a personal computing device, other embodiments may utilize other types of IHSs.

IHSs (e.g., servers, personal computers, such as laptop computer or workstations) can wind up in unexpected locations, and as such it would be beneficial to disable an IHS until it can be proven to be in a proper location. Configuring a Global Positioning System (GPS) device on an IHS may not work since reception of GPS signals may not get inside the data center. For example, servers, which comprise a type of IHS 100, may be configured in a data center that purposefully inhibits Radio Frequency (RF) radiation from entering or leaving its building structure as many building structures are often configured as Faraday cages that block any effective RF radiation passing through its walls and ceiling for security reasons. While the location-based IHS disablement service 216 could otherwise use a GPS internally configured in the IHS 100, the building structure may block its use due to its RF shielding capabilities. As will be described in detail herein below, systems and methods for location-based disablement of IHSs are provided whereby the location of an IHS can be determined with a relatively high level of certainty such that compliance with the various political jurisdictions (e.g., sovereign countries) around the world can be maintained with a relatively high level of accuracy.

FIG. 1 is a block diagram of components of an example IHS 100 that may implement a location-based IHS disablement system according to one embodiment of the present disclosure. As depicted, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor 101. Chipset 102 may provide processor 101 with access to several resources. In some cases, chipset 102 may utilize a QuickPath Interconnect (QPI) bus to communicate with processor 101. Chipset 102 may also be coupled to communication interface(s) 105 to enable communications between IHS 100 and various wired and/or wireless networks, such as Ethernet, WiFi, BT, cellular or mobile networks (e.g., code-division multiple access or "CDMA," time-division multiple access or "TDMA," Long-Term Evolution or "LTE," etc.), satellite networks, or the like. In some cases, communication interface(s) 105 may be used to communicate with devices (e.g., BT speakers, microphones, headsets, etc.). Moreover, communication interface(s) 105 may be coupled to chipset 102 via a PCIe bus.

Chipset 102 may be coupled to display controller(s) 104, which may include one or more or graphics processor(s) (GPUs) on a graphics bus, such as an Accelerated Graphics Port (AGP) or Peripheral Component Interconnect Express (PCIe) bus. As shown, display controller(s) 104 provide video or display signals to display device 111. In other implementations, any number of display controllers or display devices may be used.

Display device 111 may include Liquid Crystal Display (LCD), Light Emitting Diode (LED), organic LED (OLED), or other thin film display technologies. Display device 111 may include a plurality of pixels arranged in a matrix, configured to display visual information, such as text, two-dimensional images, video, three-dimensional images, etc. In some cases, display device 111 may be provided as a single continuous display, rather than two discrete displays.

Chipset 102 may provide processor 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like. System memory 103 may store program instructions that, upon execution by processor 101, enable a collaboration mode for a touchpad coupled or integrated into IHS 100.

Chipset 102 may provide components of IHS 100 (e.g., processor(s) 101) with access to security processor 107. In various embodiments, security processor 107 may include a chip or core dedicated to providing encryption or other security operations to IHS 100. For example, security processor 107 may include a Trusted Platform Module (TPM) configured to securely store encryption keys and measurements that help verify the integrity of IHS 100. Additionally, or alternatively, a TPM-like architecture of security processor 107 may be integrated into processor(s) 101, BIOS/EC 109, a Baseboard Management Controller (BMC) 112, etc. Other examples of security processor(s) 107 include, but are not limited to: AMD's PLATFORM SECURITY PROCESSOR (PSP), MICROSOFTS's PLUTON, INTEL's CONVERGED SECURITY AND MANAGEMENT ENGINE (CSME), etc.

In some embodiments, security processor 107 may include registers, such as platform configuration registers (PCRs), and secure storage, such as a Non-Volatile Random-Access Memory (NVRAM). Security processor 107 may also include a cryptographic processor that supports various cryptographic capabilities. For example, a pre-boot process implemented by security processor 107 may utilize its cryptographic capabilities to calculate hash values that are based on software and/or firmware instructions utilized by certain core components of IHS 100. These calculated hash values may then be compared against reference hash values that were previously stored in a secure non-volatile memory, such as during factory provisioning of IHS 100. In this manner, security processor 107 may establish a root of trust that includes core components of IHS 100 validated as operating using instructions that originate from a trusted source.

In some embodiments, chipset 102 may also provide access to one or more hard drives, solid state drives, optical drives, or other removable-media drives. In certain embodiments, chipset 102 may also provide access to one or more Universal Serial Bus (USB) ports 108, to which one or more peripheral devices may be coupled (e.g., internal or external webcams, microphones, speakers, etc.).

Chipset 102 may further provide access to one or more user input devices 106, for example, using a super I/O controller or the like. Examples of user input devices 106 include, but are not limited to, a keyboard, mouse, touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105).

In certain embodiments, chipset 102 may also provide an interface for communications with one or more hardware (HW) sensors 110. Hardware sensors 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic, ultrasonic, proximity, position, deformation, bending, direction, movement, velocity, rotation, and/or acceleration sensor(s).

Upon booting of IHS 100, processor(s) 101 may utilize Basic Input/Output System (BIOS) instructions of BIOS/Embedded Controller (EC) 109 to initialize and test hardware components coupled to IHS 100 and to load an OS for use by IHS 100. BIOS/EC 109 provides an abstraction layer that allows the OS to interface with certain hardware components that are utilized by IHS 100. Via the hardware abstraction layer provided by BIOS/EC 109, software stored in system memory 103 and executed by processor 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS/EC 109 is intended to also encompass a UEFI component.

BIOS/EC 109 may be installed as a Trusted Execution Environment (TEE) component to the motherboard of IHS 100. BIOS/EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by BIOS/EC 109 may be used to provide various core operations of IHS 100, such as power management and management of certain modes of IHS 100 (e.g., turbo modes, maximum operating clock frequencies of certain components, etc.).

In some implementations, a low-power mode of operation may include the S0 low-power idle model, also known as Modern Standby or Connected Standby, which provides an instant on/off user experience and maintains a network connection for certain processes while consuming very little power. These power modes may be entered, for example, when IHS 100 transitions into standby (e.g., "sleep," etc.).

BIOS/EC 109 may also implement operations for detecting certain changes to the physical configuration or posture of IHS 100 and managing the modes of a touchpad or other user input device 106 in different configurations of IHS 100. For instance, where IHS 100 as a 2-in-1 laptop/tablet form factor, BIOS/EC 109 may receive inputs from a lid position or hinge angle sensor (e.g., one or more of sensors 110), and it may use those inputs to determine: whether the two sides of IHS 100 have been latched together to a closed position or a tablet position, the magnitude of a hinge or lid angle, etc.

BIOS/EC 109 may be further configured to calculate hashes or signatures that uniquely identify individual components of IHS 100. In such scenarios, BIOS/EC 109 may calculate a hash value based on the configuration of a hardware and/or software component coupled to IHS 100. For instance, BIOS/EC 109 may calculate a hash value based on all firmware and other code or settings stored in an onboard memory of a hardware component. Such hash values may be calculated as part of a trusted process of manufacturing IHS 100 and may be maintained in secure storage as a reference signature. BIOS/EC 109 may later recalculate the hash value for a component and compare it against the reference hash value to determine if any modifications have been made to the component, thus indicating that the component has been compromised. In this manner, BIOS/EC 109 may validate the integrity of hardware and software components installed on IHS 100.

The IHS 100 may also be configured with a Baseboard Management Controller (BMC) 112 for use in managing various resources of the IHS 100. The BMC 112 may include non-volatile memory having program instructions stored thereon that enable remote management of the IHS 100. For example, BMC 112 may enable a user to discover, configure, and manage the IHS 100, setup configuration options, resolve and administer hardware or software problems, and the like. Additionally or alternatively, the BMC 112 may include one or more firmware volumes, each volume having one or more firmware files used by the BIOS' firmware interface to initialize and test components of the IHS 100.

As a non-limiting example of the BMC 112, the integrated DELL Remote Access Controller (IDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS 100 from the factory.

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be executed by components integrated into processor(s) 101 as systems-on-a-chip (SoC). As such, in various embodiments, IHS 100 may be implemented as different classes of computing devices including, but not limited to: servers, workstations, desktops, laptops, appliances, video game consoles, tablets, smartphones, etc.

Figure 2:
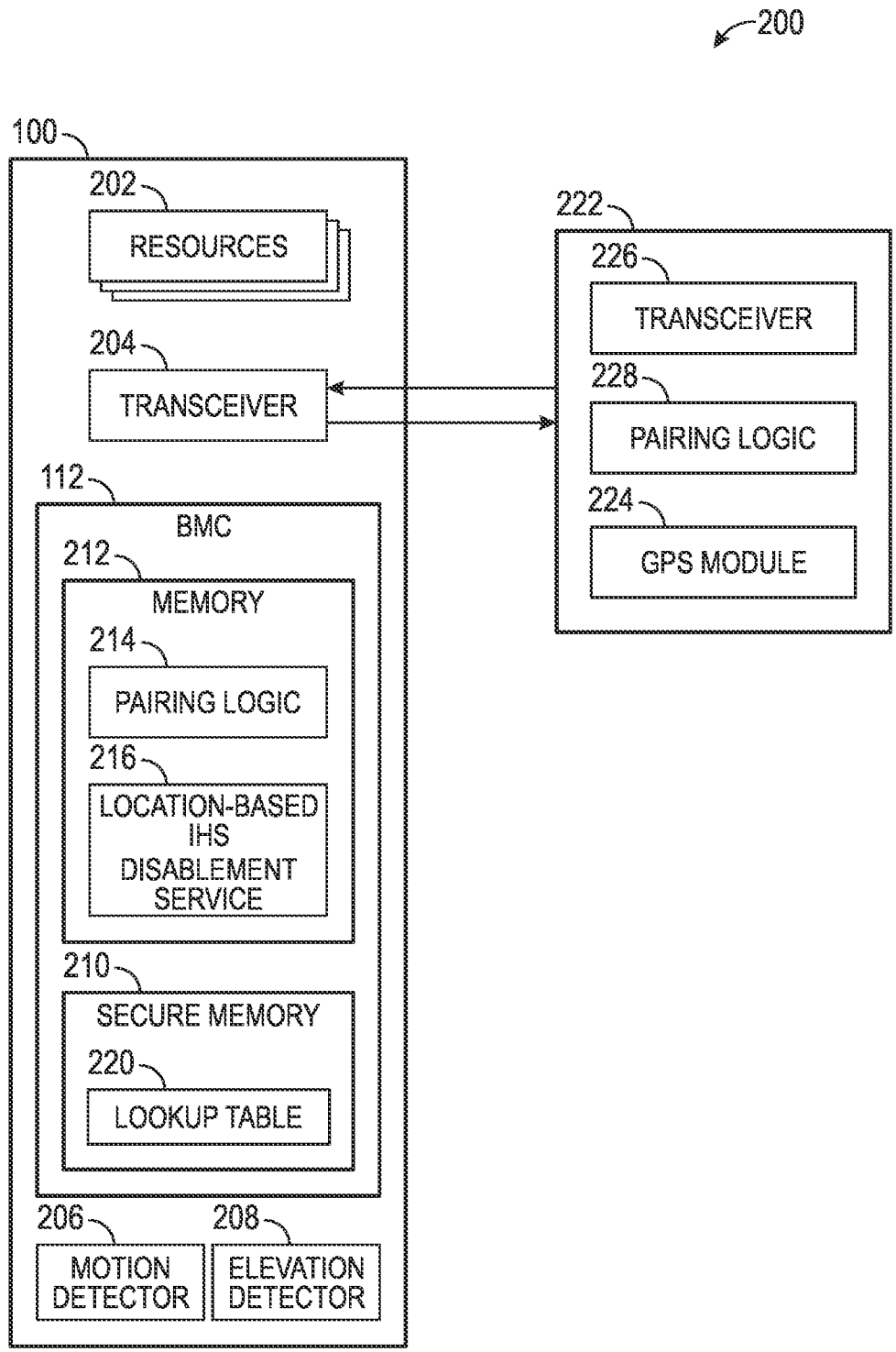
FIG. 2 illustrates an example location-based IHS disablement system that may be implemented on the IHS according to one embodiment of the present disclosure.

FIG. 2 illustrates an example location-based IHS disablement system 200 that may be implemented on the IHS 100 according to one embodiment of the present disclosure. The location-based IHS disablement system 200 includes an IHS 100 configured with one or more resources 202, a short range wireless transceiver 204, a BMC 112, and one or more location detectors, such as a motion detector 206 and/or an elevation detector 208. The BMC 112 is configured with a secure memory 210 that stores a lookup table 220, and a memory 212 for storing pairing logic 214 and a location-based IHS disablement service 216. As will be described herein below, the location-based IHS disablement service 216 determines a physical location of the IHS 100, determines whether the IHS 100 is disposed at a restricted location or at an allowed location, and disables or enables operation of the IHS 100 based on the determination.

While the present example embodiment of the location-based IHS disablement system 200 is described herein as a dongle 222 that is paired with a single IHS 100, it should be appreciated that in other embodiments, the dongle 222 may be paired or otherwise married to multiple IHSs 100, such as to some, most, or all IHSs 100 configured in a data center. For example, the dongle 222 may be configured with a built-in immutable private key that cannot be spoofed, and can be used for authentication and session setup with multiple IHSs 100. To this end, The IHSs 100 would store the public key corresponding to the private key stored in the dongle 222. A session key may be generated using a Public Key Infrastructure (PKI) handshake procedure in which the location coordinates are transmitted from the dongle 222 to the IHSs 100 after being encrypted with the generated session key. Other communication techniques for securely communicating location information from a single device (e.g., dongle 222) to many IHSs 100 could be used without departing from the spirit and scope of the present disclosure.

The location-based IHS disablement service 216 may detect the current location or movement of the IHS 100 in any suitable manner. In one embodiment, the location-based IHS disablement service 216 may access a motion detector 206 and/or elevation detector 208 to detect that the IHS 100 has been or is being moved to trigger a determination as to whether the IHS 100 should be disabled based upon its current location. In another embodiment, the location-based IHS disablement service 216 may communicate with a Global Positioning System (GPS) module 224 configured in the dongle 222 to obtain the current location, and impose certain resource limitations based on the determined location. In other embodiments, the location-based IHS disablement service 216 may receive location information from a GPS (not shown) configured in the IHS 100 to determine which resource limitations should applied.

In one embodiment, the dongle 222 includes pairing logic 228 for causing the dongle 222 to be securely paired with the IHS 100 using pairing logic 214. For example, the dongle 222 may be paired with the IHS 100 at the factory (e.g., where the IHS 100 is assembled or manufactured) using a security key of the factory such that the dongle 222 is uniquely associated with (e.g., married to) that particular IHS 100 throughout the serviceable life of the IHS 100. Therefore, to pair the IHS 100 with another different dongle 222 would most often require that the IHS 100 be authorized by the factory to pair it again with the other dongle 222.

Embodiments of the present disclosure may provide certain benefits when a GPS enabled dongle 222 is used to vouch for the location of the IHS 100. For example, servers, which comprise a type of IHS 100, may be configured in a data center. Most data centers, however, purposefully inhibit Radio Frequency (RF) radiation from entering or leaving its building structure as they are often configured as Faraday cages to block any effective RF radiation passing through its walls and ceiling for security reasons. While the location-based IHS disablement service 216 could otherwise use an GPS internally configured in the IHS 100, the building structure of the data center may block its use due to its RF shielding capabilities. The dongle 222 provides a solution to this problem, among others, by enabling temporary physical separation of the GPS module 224 from the IHS 100 so that a relatively accurate assessment of the location of the IHS 100 may be securely obtained, thus constructing a relatively good level of trust as to its current location. Additional details of how the dongle 222 works or functions will be described in detail herein below.

The lookup table 220 stores information about multiple locations and for each location, whether the IHS 100 is restricted from use in that location. For example, the lookup table 220 may store information about certain political jurisdictions (e.g., countries) in which the IHS 100 is enabled for use, and other political jurisdictions in which the IHS 100 should be restricted from being used. In one embodiment, the lookup table 220 may include a flag indicating whether the entries in the lookup table 220 are to be taken as a whitelist or a blocklist. When taken as a whitelist, the location-based IHS disablement service 216 only allows use of the IHS 100 at those locations explicitly identified in the lookup table 220 and restricts use of the IHS 100 at all other locations. When taken as a blocklist, on the other hand, the location-based IHS disablement service 216 restricts use of the IHS 100 at those locations explicitly identified in the lookup table 220 and allows use of the IHS 100 at all other locations. In one embodiment, the lookup table 220 is stored in the secure memory 210 portion of the BMC 112 such that it is only accessible by users (e.g., vendor of the IHS 100) possessing the keys used to secure the secure memory 210 portion. In another embodiment, the lookup table 220 may be stored in a secure memory portion of the IHS 100. Such a feature may be useful in cases where no BMC 112 exists on the IHS 100.

In one embodiment, the location-based IHS disablement service 216 may allow the IHS 100 to perform a limited set of tasks if that IHS 100 is determined to exist in a restricted location. For example, the location-based IHS disablement service 216 may include executable logic to communicate with and notify a centralized online server about the restricted location of the IHS 100. The centralized online service may be, for example, an online support portal managed by the vendor of the IHS 100. Other tasks may include generating a pop-up window on a display coupled to the IHS 100 informing a user of the IHS 100 that it is not authorized for use at the present location.

Figure 3:
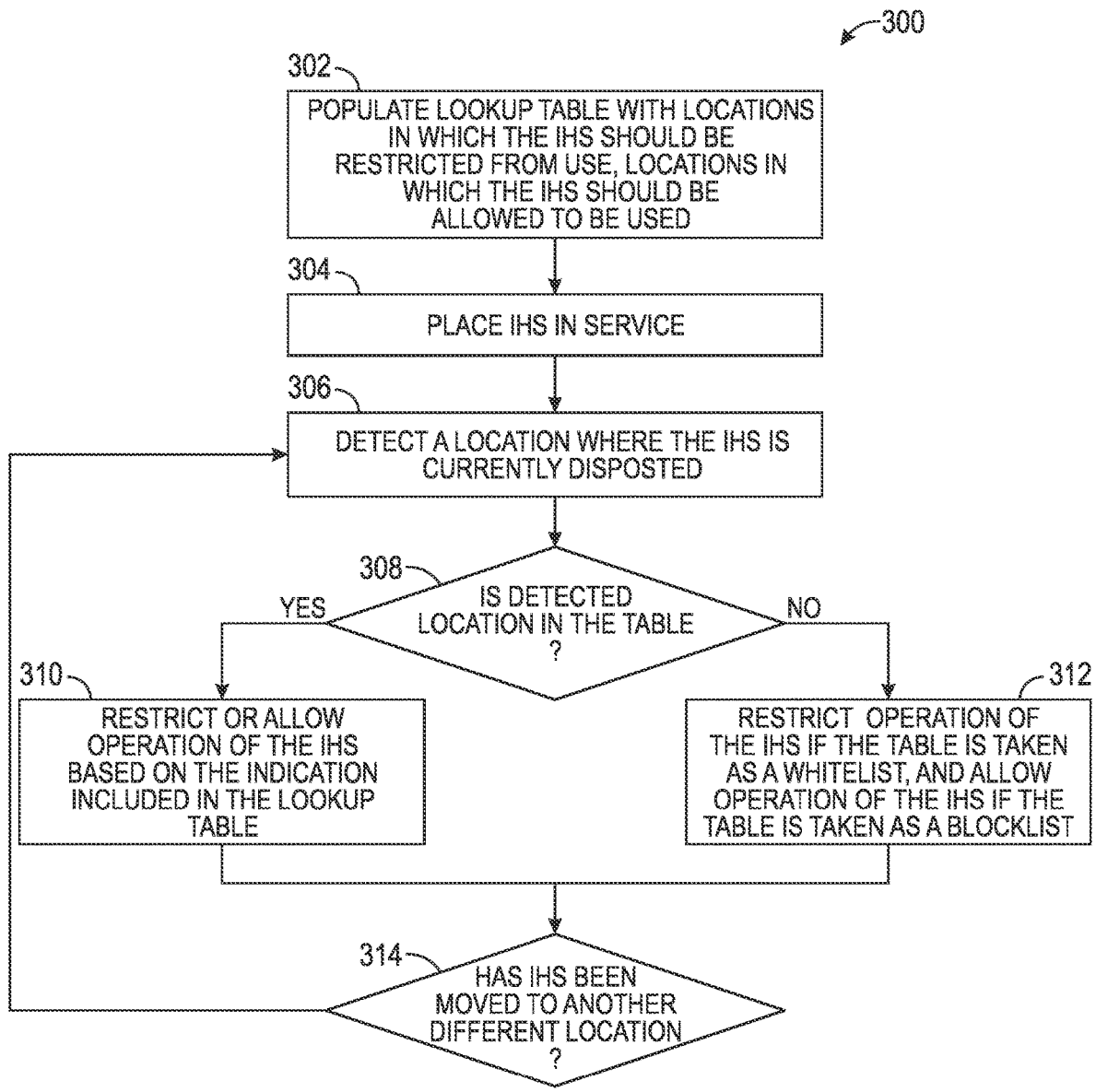
FIG. 3 illustrates a flow diagram showing one embodiment of an example location-based IHS disablement method according to one embodiment of the present disclosure.

FIG. 3 illustrates a flow diagram showing one embodiment of an example location-based IHS disablement method 300 according to one embodiment of the present disclosure. Additionally or alternatively, some, most, or all steps of the location-based IHS disablement method 300 may be performed by the location-based IHS disablement service 216 as described above with reference to FIG. 2. In one embodiment, the method 300 may be performed each time the IHS 100 is re-booted. In another embodiment, the method 300 may be performed whenever movement of the IHS 100 is detected, such as via the motion detector 206, elevation detector 208, and/or GPS module 224. In yet another embodiment, the method 300 may be performed at ongoing intervals (e.g., periodically) or in response to a manual request, such as when a user or administrator would like to ensure compliance of the IHS 100 to the restrictions allocated for that location. Additionally, while the location-based IHS disablement method 300 describes a single dongle 222 being paired with a single IHS 100, it should be appreciated that the location-based IHS disablement method 300 may be performed by a single dongle 222 that is paired with multiple IHSs 100, such as with multiple IHSs 100 configured in a data center.

Initially at step 302, the method 300 populates the lookup table 220 with locations in which the IHS should be restricted from use, such as when the lookup table 216 is configured as a blocklist, as well as locations in which the IHS should be allowed to be used, such as when the lookup table 216 is configured as a whitelist. For example, the vendor, during assembly or manufacture of the IHS 100, may populate the lookup table 220 with the latest known location compliance restrictions for each location, and securely store the lookup table 220 in a memory of the IHS 100, such as a secure memory 210 of the BMC 112 configured in the IHS 100. The lookup table 220 may be populated with any suitable quantity of type of location based restrictions. For example, the lookup table 220 may be populated with restrictions associated with political jurisdictions (e.g., countries), and/or organizational premises of one or more corporations, schools, clubs, and the like. Thereafter at step 304, the IHS 100 is placed in service. That is, the IHS 100 may be installed in its desired location, such as being installed in a computing rack configured within a data center, and turned on.

At step 306, the method 300 detects a location where the IHS 100 is currently disposed. For example, the method 300 may communicate with either of a motion detector 206, an elevation detector 208, a GPS module 224, and/or other location detecting device to determine the current location of the IHS 100. In one embodiment, the method 300 may use a last known location technique in which the method 300 accepts the last location measurement obtained by the dongle 222 before GPS reception is lost. In this particular case, the method 300 may apply another time window at which the last known location remains valid. For example, if the last known location technique is used, the service 216 may provide a time window (e.g., approximately 5 to 10 minutes) to leave ample time at which the IHS 100 can be installed and powered on when placed in a remote location, such as an underground bunker in which the user can go down an elevator or other ambulatory means to access the IHS 100 and authenticate its location. The method 300 at step 308 determines if the detected location is explicitly recorded in the lookup table 216. If so, processing continues at step 310; otherwise, processing continues at step 312.

At step 310, the method 300 restricts or allows operation of the IHS based on the indication included in the lookup table 216. For example, if the lookup table 216 is configured as a whitelist and the detected location is listed in the lookup table 216, operation of the IHS 100 is allowed. On the other hand, if the lookup table 216 is configured as a blocklist and the detected location is listed in the lookup table 216, operation of the IHS 100 is restricted. Step 312 is performed if the detected location is not recorded in the lookup table 216. At step 312, the method 300 restricts operation of the IHS if the table is taken as a whitelist, while allowing operation of the IHS if the table is taken as a blocklist.

In one embodiment, the method 300 may allow the IHS 100 to perform limited operations when it is restricted from normal use. For example, the method 300 may inform a centralized online server that the IHS 100 has been moved to a restricted location and as such, is restricted from use. As another example, the method 300 may be continually performed such that, when the IHS 100 is moved to a non-restricted location, its normal operation may again be allowed.

At this point, the IHS 100 is either allowed or restricted from operation based upon its current location. Later on, at step 314, the method 300 determines that the IHS 100 has been moved to a location different from that detected above at step 304. When this occurs, processing continues at step 306 to again determine the current location of the IHS 100, and apply restrictions appropriate for that location. For example, the method 300 may determine that, via signals obtained from one or more sensors, such as the motion detector 206 and/or elevation detector 208, that the IHS 100 has been moved, it may again perform steps 306-312 again and either allow or restrict operation of the IHS 100 based on its new detected location.

The steps described above may be performed throughout the serviceable life of the IHS 100. Nevertheless, when use of the location-based IHS disablement method 300 is no longer needed or desired, the process ends.

Although FIG. 3 describes an example method 300 that may be performed to maintain compliance with relevant local restrictions for operation of the IHS 100, the features of the method 300 may be embodied in other specific forms without deviating from the spirit and scope of the present disclosure. For example, the method 300 may perform additional, fewer, or different operations than those described in the present examples. For another example, the method 300 may be performed in a sequence of steps different from that described above. As yet another example, certain steps of the method 300 may be performed by other components in the IHS 100 other than those described above.

Figure 4:
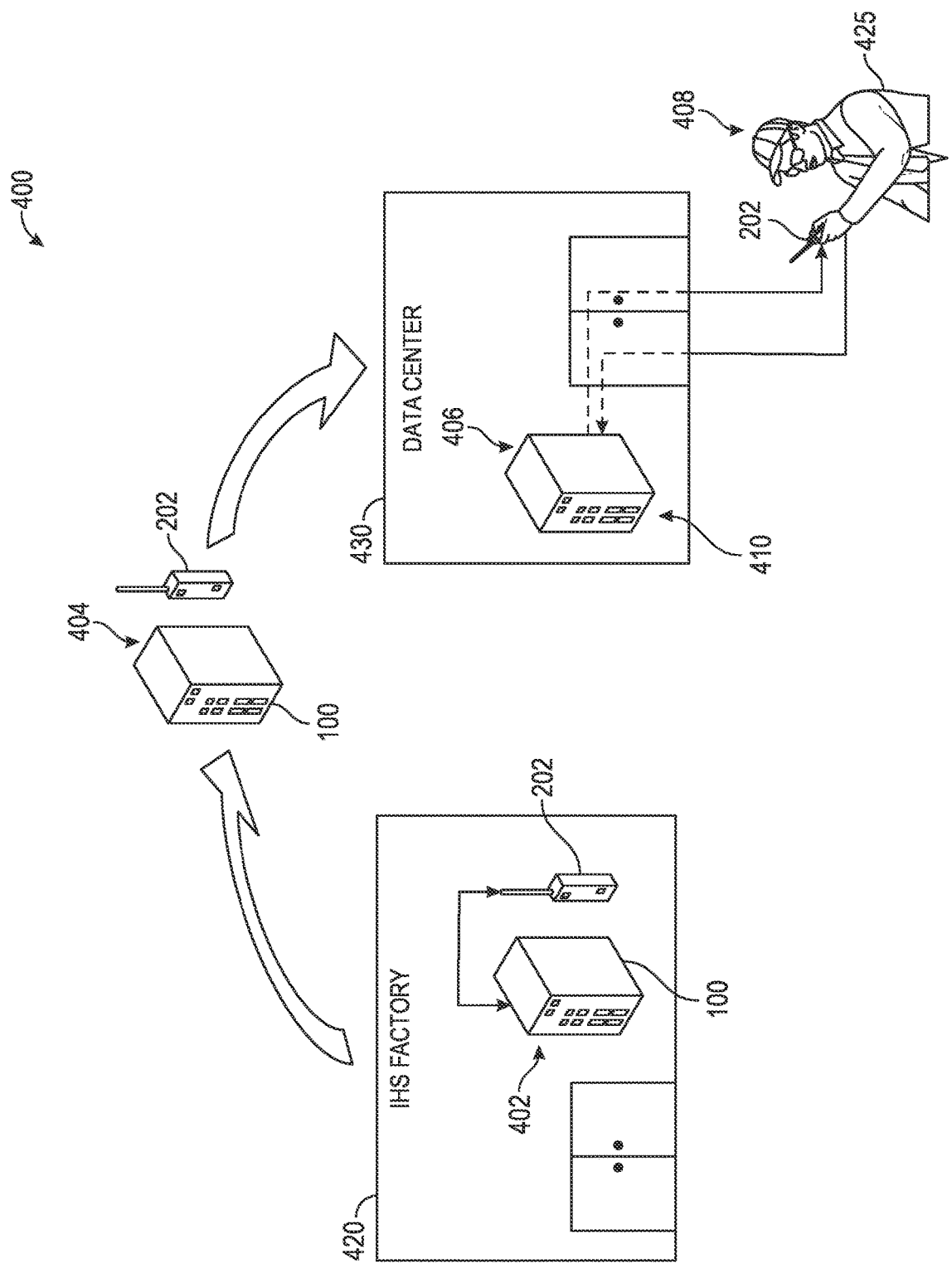
FIG. 4 illustrates an example location determining procedure that may be implemented with the GPS enabled dongle to provide a relatively high degree of trust with regard to the location of an IHS according to one embodiment of the present disclosure.

FIG. 4 illustrates an example location determining procedure 400 that may be implemented with the GPS enabled dongle 222 to provide a relatively high degree of trust with regard to the location of an IHS 100 according to one embodiment of the present disclosure. As mentioned previously, GPS devices that require good reception in order to accurately determine its present location, are often hindered when placed in certain buildings, such as data centers that are often configured as a Faraday cage to purposefully limit the amount of RF radiation coming into and going out of the building. As such, the dongle 222 may be used to temporarily be separated from its paired IHS 100 to obtain an accurate measurement of the location so that the location of the IHS 100 can be accurately ascertained.

Initially at step 402, the dongle 222 is paired with the IHS 100 at a factory 420 where the IHS 100 is manufactured or otherwise assembled into its final form for use by a user. The paired IHS 100 and dongle 222 are then shipped to a user, which in the particular example embodiment, is a data center 430 at step 404. At step 406, the IHS 100 is installed in the data center 430, such as by mounting the IHS 100 in a computing rack and connecting the IHS 100 to an available power source.

Once electrical power is applied to the IHS 100 it may, during its bootstrap process, issue a request to the user 425 (e.g., via a popup window on a display), to move the dongle 222 to a location where GPS RF can be received to obtain an accurate location measurement. Thus at step 408, the user 425 moves the dongle 222 to another location with sufficient GPS signal reception to obtain an accurate location measurement. For example, the user 425 may go outside of the data center 430 to obtain an accurate location measurement, or as another example, the user 425 may move towards a window in the data center where GPS reception may be improved. At step 410, the user 425 moves the dongle 222 back in relatively close proximity to the IHS 100 so that the measured location can be transferred to the IHS 100 to be used by the location-based IHS disablement service 216. When the location-based IHS disablement service 216 receives the location measurement from the dongle 222, it may then apply any location-based restrictions such as described above with reference to FIGS. 3 and 4.

In one embodiment, the wireless link between the transceiver 204 configured in the IHS 100 and the transceiver 226 configured in the dongle 222 is a short range wireless link that is only good over a relatively short distance (e.g., approximately 2 inches to 30 feet of separation). The short range may alleviate interference caused by wireless communication links from other paired IHSs 100/dongle 222 combinations, and mitigate spoofing attacks where an illicitly used dongle may be used to spoof the actual location of the IHS 100. Examples of suitable types of short range wireless links may include a near-field communication (NFC) link, an infrared communication link, a Bluetooth link, and a Ultra-Wide Band (UWB) link to name a few.

In another embodiment, logic within the location-based IHS disablement service 216 or dongle 222 may be configured with a time window to ensure that the dongle's location is not spoofed. That is, the dongle 222 may, after acquiring a valid location measurement from the GPS module 224 at step 408, provide a short time window (e.g., 2 to 10 minutes) in which the location measurement is provided to the IHS 100 at step 410. Should the user 425 not complete steps 408 and 410 within the specified time window, the location-based IHS disablement system 200 may allow the user 425 to repeat the aforementioned steps to provide location-based authorization for the IHS 100 using the GPS-enabled dongle 222.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), that comprises:
   a processor; and
   a memory coupled to the processor, the memory having program instructions stored thereon that, upon execution, cause the processor to:
   detect, while an IHS bootstrap process is active, a location where the IHS is disposed;
   determine, while the IHS bootstrap process is active, whether the IHS is disposed at a restricted location or an allowed location;
   when the IHS is disposed at the restricted location, inhibit operation of the IHS, while the IHS bootstrap process is active; and
   when the IHS is disposed at the allowed location, enable operation of the IHS.

2. The IHS of claim 1, wherein the location comprises at least one of a political jurisdiction or a premise of an organization.

3. The IHS of claim 1, wherein further program instructions, upon execution from an other memory, further cause an other processor of an other IHS of a plurality of IHSs to determine whether each other IHS of the plurality of IHSs is disposed at a restricted location or at an allowed location, and for each other IHS:
   when the other IHS is disposed at the restricted location, inhibit operation of the other IHS; and
   when the other IHS is disposed at the allowed location, enable operation of the other IHS.

4. The IHS of claim 1, wherein the program instructions, upon execution, further cause the processor to, when the IHS is disposed at the restricted location, allow the IHS to perform only a limited set of allowed tasks.

5. The IHS of claim 4, wherein the program instructions, upon execution, further cause the processor to communicate with and notify a centralized online server about the restricted location of the IHS, wherein notification of the centralized online server about the restricted location of the IHS comprises one allowed task of the limited set of allowed tasks.

6. The IHS of claim 1, wherein the program instructions are executed by a security processor configured in at least one of the IHS or by a processor of a Baseboard Management Controller (BMC) configured in the IHS.

7. The IHS of claim 1, wherein to detect the location where the IHS is disposed, the program instructions, upon execution, further cause the processor to communicate with a dongle to obtain location information associated with the IHS using a Global Positioning System (GPS) module configured in the dongle.

8. The IHS of claim 7, wherein to obtain the location information from the dongle, the program instructions, upon execution, further cause the processor to communicate with the dongle over a short range wireless communication link.

9. The IHS of claim 7, wherein to obtain the location information from the dongle, the program instructions, upon execution, further cause the processor to determine that the location information from the dongle is only valid when the location information is received within a specified time window.

10. The IHS of claim 1, wherein the program instructions, upon execution, further cause the processor to perform steps that comprise detect the IHS location, determine whether the IHS is disposed at the restricted or allowed location, and inhibit or enable operation of the IHS each time the IHS is re-booted.

11. A location-based Information Handling System (IHS) disablement method comprising:
   detecting, by an IHS while the IHS is bootstrapping, a location where the IHS is disposed;
   determining, by the IHS while the IHS is bootstrapping, whether the IHS is disposed at a restricted location or an allowed location;
   when the IHS is disposed at the restricted location, disabling, by the IHS while the IHS is bootstrapping, operation of the IHS; and
   when the IHS is disposed at the allowed location:
      enabling, by the IHS, operation of the IHS;
      periodically determining, by the enabled IHS, whether the IHS is disposed at a restricted location; and
      in response to determining the enabled IHS is disposed at a restricted location, inhibiting operation of the enabled IHS, by the IHS.

12. The location-based IHS disablement method of claim 11, further comprising periodically determining whether each of a plurality of other IHSs is disposed at a restricted location or at an allowed location, and for each of the other IHSs:
   when the other IHS is disposed at the restricted location, inhibiting operation of the other IHS; and
   when the other IHS is disposed at the allowed location, enabling operation of the other IHS.

13. The location-based IHS disablement method of claim 12, wherein inhibiting operation of the other IHS further comprises allowing the other IHS to perform only a limited set of allowed tasks.

14. The location-based IHS disablement method of claim 13, further comprising communicating with and notifying a centralized online server about the restricted location of the inhibited IHS, the notifying of the centralized online server of the restricted location comprising one allowed task of the limited set of allowed tasks.

15. The location-based IHS disablement method of claim 11, further comprising communicating with a dongle to obtain location information associated with the IHS using a Global Positioning System (GPS) module configured in the dongle to detect the location where the IHS is disposed.

16. The location-based IHS disablement method of claim 15, further comprising communicating with the dongle over a short range wireless communication link to obtain the location information from the dongle.

17. The location-based IHS disablement method of claim 15, further comprising determining that the location information from the dongle is only valid when the location information is received within a specified time window to obtain the location information from the dongle.

18. A memory storage device having program instructions stored thereon that, upon execution by an Information Handling System (IHS) processor, cause the IHS to perform operations that comprise:
   detect, while an IHS bootstrap process is active, a location where the IHS is disposed;
   determine, while the IHS bootstrap process is active, whether the IHS is disposed at a restricted location or at an allowed location, based at least in part on a lookup table accessible to the IHS with a security key from a secure memory;
   when the IHS is disposed at the restricted location, disable operation of the IHS, while the IHS bootstrap process is active; and
   when the IHS is disposed at the allowed location:
      enable operation of the IHS;
      determine whether movement of the enabled IHS from the allowed location is detected, based at least in part on a location detector and at least one of a motion detector or an elevation detector;
      in response to a determination movement of the enabled IHS is detected, determine whether the enabled IHS is disposed at a restricted location, based at least in part on the lookup table; and
      in response to a determination the enabled IHS is disposed at the restricted location, either disable the IHS or inhibit operation of the IHS, based at least in part on the lookup table.

19. The memory storage device of claim 18, wherein further program instructions, upon execution by an other IHS processor, further cause the other IHS processor to determine whether each of a plurality of other IHSs is disposed at a restricted location or at an allowed location, and for each other IHS:
   when the other IHS is disposed at the restricted location, inhibit operation of the other IHS; and
   when the other IHS is disposed at the allowed location, enable operation of the other IHS.

20. The memory storage device of claim 18, wherein further program instructions, upon execution, further cause the processor to communicate with and notify a centralized online server about the restricted location of the disabled or inhibited IHS, wherein communicate with and notify the centralized online server of the restricted location comprises one of a limited set of tasks the disabled or inhibited IHS is allowed to perform at the restricted location.

\* \* \* \* \*